(12) United States Patent
Vedder et al.

(10) Patent No.: US 11,117,494 B2
(45) Date of Patent: *Sep. 14, 2021

(54) LOCKING UNIT FOR A VEHICLE SEAT, AND VEHICLE SEAT

(71) Applicant: Adient Luxembourg Holding S.à.r.l., Luxembourg (LU)

(72) Inventors: Andreas Vedder, Haan (DE); Uwe Moeller, Solingen (DE); Igor Gordeenko, Frechen (DE); Oezkan Demirci, Bochum (DE); Patrick Handl, Cologne (DE); Silke Labuk, Weilerbach (DE); Christina Jungblut, Obernheim-Kirchenarnbach (DE); Peter Mueller, Mackenbach (DE); Stefan Haber, Pirmasens (DE); Volker Windecker, Sippersfeld (DE); Richard Haensel, Flonheim (DE)

(73) Assignee: Adient Luxembourg Holding S.à.r.l., Luxembourg (LU)

( * ) Notice: Subject to any disclaimer, the term of this patent is extended or adjusted under 35 U.S.C. 154(b) by 871 days.

This patent is subject to a terminal disclaimer.

(21) Appl. No.: 15/556,827

(22) PCT Filed: Mar. 7, 2016

(86) PCT No.: PCT/EP2016/054739
§ 371 (c)(1),
(2) Date: Sep. 8, 2017

(87) PCT Pub. No.: WO2016/142320
PCT Pub. Date: Sep. 15, 2016

(65) Prior Publication Data
US 2018/0050611 A1   Feb. 22, 2018

(30) Foreign Application Priority Data

Mar. 9, 2015 (DE) ..................... 10 2015 204 190.5

(51) Int. Cl.
*B60N 2/015* (2006.01)
*B60N 2/90* (2018.01)
(Continued)

(52) U.S. Cl.
CPC ..... *B60N 2/01516* (2013.01); *B60N 2/01583* (2013.01); *B60N 2/366* (2013.01);
(Continued)

(58) Field of Classification Search
CPC ............... B60N 2/01516; B60N 2/366; B60N 2/01583; B60N 2205/20; E05B 77/40; E05B 85/243; E05B 85/26
See application file for complete search history.

(56) References Cited

U.S. PATENT DOCUMENTS 4,756,564 A   7/1988 Ideka

FOREIGN PATENT DOCUMENTS

DE        103 27 448 A1    1/2005
DE   10 2006 003 022 A1    7/2007
(Continued)

*Primary Examiner* — Kristina R Fulton
*Assistant Examiner* — Thomas L Neubauer
(74) *Attorney, Agent, or Firm* — Marshall & Melhorn, LLC

(57) ABSTRACT

A locking unit (10), for a vehicle seat (1), includes a locking pawl (80) which is mounted so as to be pivotable about a pivot axis between an open position and a closed position and which has a retention contour (27) for securing a locking bolt (12) in the closed position. At least one claw (90, 91, 92), offset in the axial direction with respect to the locking pawl (80), is mounted so as to be pivotable about the same pivot axis. The claw (90, 91, 92) has a closure contour (25). The locking pawl (80) can be pivoted from the open position to the closed position by the closure contour (25) being acted upon by the locking bolt (12).

20 Claims, 11 Drawing Sheets

(51) Int. Cl.
*E05B 77/40* (2014.01)
*B60N 2/36* (2006.01)
*E05B 85/24* (2014.01)
*E05B 85/26* (2014.01)

(52) U.S. Cl.
CPC ............ *E05B 77/40* (2013.01); *E05B 85/243* (2013.01); *E05B 85/26* (2013.01); *B60N 2205/20* (2013.01)

(56) References Cited

FOREIGN PATENT DOCUMENTS

| | | |
|---|---|---|
| DE | 10 2007 016 409 A1 | 10/2008 |
| DE | 10 2007 054 765 A1 | 5/2009 |
| DE | 10 2009 021 297 A1 | 11/2010 |
| DE | 10 2009 037 037 A1 | 2/2011 |
| DE | 20 2011 100 040 U1 | 8/2011 |
| DE | 10 2012 021 702 A1 | 3/2014 |
| EP | 2 305 929 A2 | 4/2011 |
| JP | 2010 285127 A | 12/2010 |
| WO | 2010/054860 A2 | 5/2010 |
| WO | 2014/125197 A2 | 8/2014 |
| WO | 2015/036360 A1 | 3/2015 |

LOCKING UNIT FOR A VEHICLE SEAT, AND VEHICLE SEAT

CROSS REFERENCE TO RELATED APPLICATIONS

This application is a U. S. National Phase Application of International Application PCT/EP2016/054739, filed Mar. 7, 2016, and claims the benefit of priority under 35 U.S.C. § 119 of German Application 10 2015 204 190.5, filed Mar. 9, 2015, the entire contents of which are incorporated herein by reference.

FIELD OF THE INVENTION

The invention relates to a locking unit for a vehicle seat having a locking pawl which is mounted so as to be pivotable about a pivot axis between an open position and a closed position and which has a retention contour for securing a locking bolt in the closed position, as well as at least one claw which is mounted so as to be pivotable about the same pivot axis, wherein the claw has a closure contour and the locking pawl can be pivoted from the open position to the closed position by the closure contour being acted upon by the locking bolt. The invention further relates to a vehicle seat vehicle seat comprising at least one locking unit.

BACKGROUND OF THE INVENTION

A generic locking unit for a vehicle seat is disclosed in WO 2010/054860 A2. Such a locking unit comprises a rotary latch which is pivotably mounted about a pivot axis for locking to a locking bolt. A latching pawl which is pivotably mounted about a further pivot axis secures the rotary latch in the locked state of the locking unit. A pivotably mounted clamping element which is denoted as a tolerance compensation pawl exerts a closing moment on the rotary latch and thus eliminates backlash which is present between the rotary latch and the locking bolt.

Similarly, a generic locking unit for a vehicle seat is disclosed in DE 20 2011 100 040 U1. The locking unit has two bearing pins which serve for the pivotable bearing of the rotary latch and of the latching pawl and of the clamping element. The two bearing pins also serve for fastening the locking unit to the structural part of the vehicle seat and are of approximately hollow-cylindrical configuration. Moreover, two screws are provided for fastening the locking unit to the structural part of the vehicle seat, said screws respectively penetrating one of the two bearing pins and being screwed into the structural part or an additional nut.

In the said disclosed locking units, the rotary latch in each case comprises four contours which fulfill different functions. A retention contour serves for securing the locking bolt in the locked state. A supporting contour cooperates with the clamping element for providing zero backlash and with the latching pawl for securing the rotary latch in the locked state. A hold-open contour cooperates with the latching pawl for securing the latching pawl in the unlocked state. A closure contour serves for ejecting the locking bolt when unlocking the locking unit. When locking the locking unit, the locking bolt comes to bear against the closure contour and as a result pivots the rotary latch into its closed position and the locking unit enters the locked state.

In the locked state of the locking unit, the rotary latch is in the closed position and the retention contour secures the locking bolt. In the unlocked state of the locking unit the rotary latch is in the open position.

Such locking units serve, for example, for locking a backrest of a vehicle seat to a seat part and/or to a body or structure of a vehicle or for locking the vehicle seat to the body or structure of the vehicle.

Engine hoods, tailgates or doors of vehicles may also be locked by means of such locking units to the body or structure of the vehicle.

For example, such locking units which are also denoted as locks are disclosed in DE 10 2006 003 022 A1, in DE 10 2009 021 297 A1, in DE 103 27 448 A1 and in DE 10 2009 037 037 A1. Further generic locking units are disclosed, for example, in DE 10 2007 016 409 A1 and DE 10 2012 021 702 A1. A rotary latch which is covered with a resilient plastics coating and which has a bulged portion in the contact region for providing a smaller contact surface is disclosed in U.S. Pat. No. 4,756,564.

SUMMARY OF THE INVENTION

An object of the invention is to improve a locking unit of the type mentioned in the introduction, in particular to receive in an improved manner the forces introduced into the locking unit by a locking bolt.

A generic locking unit for a vehicle seat comprises a locking pawl which is mounted so as to be pivotable about a pivot axis between an open position and a closed position and which has a retention contour for securing a locking bolt in the closed position.

In the locked state of the locking unit, the locking pawl in this case is in the closed position and the retention contour secures the locking bolt. In the unlocked state of the locking unit the locking pawl is in the open position.

Moreover, at least one claw which is mounted so as to be pivotable about the same pivot axis is provided, wherein the claw has a closure contour, wherein the locking pawl can be pivoted from the open position to the closed position by the closure contour being acted upon by the locking bolt.

According to the invention, the retention contour and/or a surface of a covering of the locking pawl facing the locking bolt has a path which has an apex in the axial direction.

By providing the apex in the path of the retention contour and/or the surface of the covering, it enables the force which is exerted by means of the locking bolt on the locking pawl and/or the claw in the closed position to be able to be received in a particularly advantageous manner, so that no excessive shear forces or bending forces occur. This is particularly advantageous when the portion of the locking bolt to be retained and which is generally oriented parallel to the axial direction twists and/or tilts relative to the axial direction.

In this case it may also be provided that the locking pawl and the claw are configured in one piece to form a rotary latch, whereby the present invention may also be applied to known embodiments with a one-piece rotary latch.

Alternatively and/or additionally, the claw which is offset relative to the locking pawl in the axial direction may be pivotably mounted about the same pivot axis.

By the separate provision of a locking pawl and at least one claw which are arranged axially offset to one another, instead of a rotary latch, the known integration of the retention contour, closure contour, supporting contour and hold-open contour on a rotary latch is advantageously achieved.

The integrated solution permits a smaller constructional space, since an optimal three-dimensional nesting of the components may be achieved by the disclosed multi-part design. The multi-part design permits the regions which receive high loads and the regions which are subjected to lower loads to be distributed over separate components. As a result, more regions may be designed from lightweight materials and the overall weight is reduced.

A locking pawl with a retention contour is thus connected to at least one claw, such that the locking pawl may be moved from an open position into a closed position by a closure contour located on the claw being correspondingly acted upon.

As a result, it is possible to design the shape of a locking pawl with a retention contour such that its point of contact with a locking bolt is located approximately in the same plane perpendicular to its pivot axis or its instantaneous center of rotation, such as a point of contact of the locking bolt with a stop element.

Preferably, therefore, the locking unit comprises a stop element which is arranged such that, when the locking unit is locked, the locking bolt bears in a first point of contact against the stop element and in a second point of contact against the retention contour or the surface of the covering of the locking pawl, wherein the first point of contact and the second point of contact are located at least approximately in one plane which extends perpendicular to the axial direction.

As a result, the locking pawl with the retention contour does not have to move about its pivot axis or has to move less about its pivot axis in order to compensate for angular deviations of the locking bolt relative to its pivot axis.

Preferably, in this case the second point of contact is located in the region of the apex.

The locking unit may further comprise that the retention contour and/or the surface of the covering of the locking pawl has a first portion and a second portion adjacent to one another in the apex, wherein the second portion is larger than the first portion.

By predetermining the dimensions and relative proportions of the first portion and the second portion relative to one another, the lateral offset to the center of the retention contour and/or of the surface may be particularly accurately defined and thus the forces introduced by the locking bolt may be particularly reliably absorbed.

Moreover, the width of the second portion in this case corresponds to a multiple of the width, in particular at least four times the width, of the first portion. By defining and predetermining the proportions of the first and second portions relative to one another, the action according to the invention may be influenced as desired and in a particularly simple manner.

Preferably, the first portion has a curvature with a radius ranging from 1 mm to 5 mm, preferably ranging from 2.5 mm to 4 mm. The second portion preferably has a curvature with a radius ranging from 30 mm to 100 mm, preferably ranging from 40 mm to 50 mm. By combining the two radii of the first portion and of the second portion, the apex may also be defined by simple means corresponding to its lateral alignment. For example, the apex through a first portion with a very small radius may have a very large lateral offset relative to the center of the retention contour and/or the surface of the covering.

As an alternative to a curvature, the first and/or second portion also may be chamfered with a planar surface and may have a corresponding individual incline which, in particular, is different from an incline of the respective other portion.

A clamping element driving the claw, with the same pivoting region, may be designed with a smaller mean contact angle relative to the claw over the contact region.

With the same drive moment of the clamping element, therefore, the clamping element only starts to move when greater forces act in an opening manner on the locking pawl.

The simultaneous contact of the locking bolt with the stop element and with the retention contour of the locking pawl is maintained even in the case of greater dynamic excitation of the locking bolt and noises due to changing contact conditions between the locking pawl, the locking bolt and the stop element are avoided.

The arrangement of the closure contour on a claw which is arranged offset to the locking pawl permits the locking pawl to be formed such that the locking pawl is able to move from the closed position into the open position without colliding with the stop element which is arranged in the same functional plane.

Preferably, the stop element is arranged offset to the claw in the axial direction. As a result, during the locking and the unlocking of the locking unit the claw pivots past the stop element.

According to one advantageous embodiment of the invention, the claw has a supporting contour which in the closed position of the locking pawl cooperates with a latching pawl for securing the locking pawl and/or with a clamping element for providing zero backlash of the locking pawl.

The locking pawl is thus connected to at least one claw which is arranged axially offset relative to the contact region of the locking bolt with the locking pawl. The supporting contour is located on at least one claw which is thus arranged and connected to the locking pawl, said supporting contour ensuring an absorption of the load at the contact region of the locking pawl with the locking bolt, even in the case of forces which may cause a movement of the clamping element.

The clamping element is preferably pivotably mounted so as to be pivotable about a second pivot axis extending parallel to the pivot axis of the locking pawl. However, for example, it is also conceivable that the clamping element is configured as a wedge guided in a translatory manner.

According to a further advantageous embodiment of the invention, the claw comprises a hold-open contour which cooperates with a latching pawl for securing the latching pawl in the open position of the locking pawl.

A hold-open contour which is arranged on a further component or on the claw, therefore, retains the claw and a latching pawl bearing thereagainst in the open position.

Alternatively, the hold-open contour may also be located on a stop element which is movably connected to the housing in the functional plane of the first pawl.

The locking pawl and the claw are preferably connected together fixedly in terms of rotation and namely in both pivoting directions. The connection of the components arranged in offset functional planes, the locking pawl and claw, may be implemented by a positive, non-positive or material connection. In some cases, the connection may be effective only in one direction of movement.

According to one advantageous development of the invention, the locking device comprises two coupling plates which extend parallel to one another and which comprise two retaining bores, one respective bearing bolt being inserted therein, and a retaining opening, a retaining bolt with a through-opening being inserted therein, wherein the retaining opening and/or the through-opening are designed as slots. As a result, it is possible to adapt the locking unit to different actual dimensions of the vehicle seat.

According to one advantageous development of the invention, the locking pawl and the claw are partially surrounded by a common covering which preferably consists of plastics. As a result, the noises generated when closing or opening the pawl by the contact of the bolt may be advantageously reduced.

According to one advantageous development of the invention, the claw has a supporting contour, a closure contour, a hold-open contour and a nose with a retention contour.

Preferably, the covering at least covers the retention contours of the noses of the locking pawl and the claw.

Preferably, the covering in the region of the retention contours has a convex bulged portion, so that in the locked state of the locking unit the points of contact of the locking bolt with the covering of the retention contours and with the stop element are approximately located in one plane which extends perpendicular to the axial direction.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
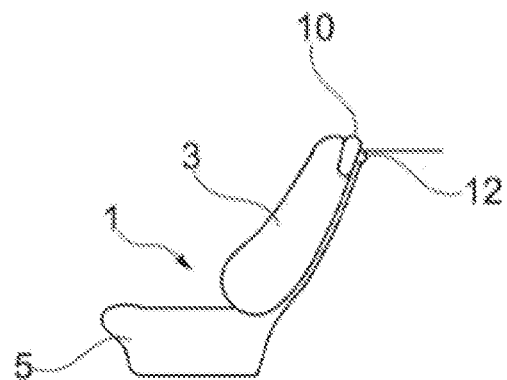
FIG. 1 is a schematic side view of a vehicle seat.
Figure 2:
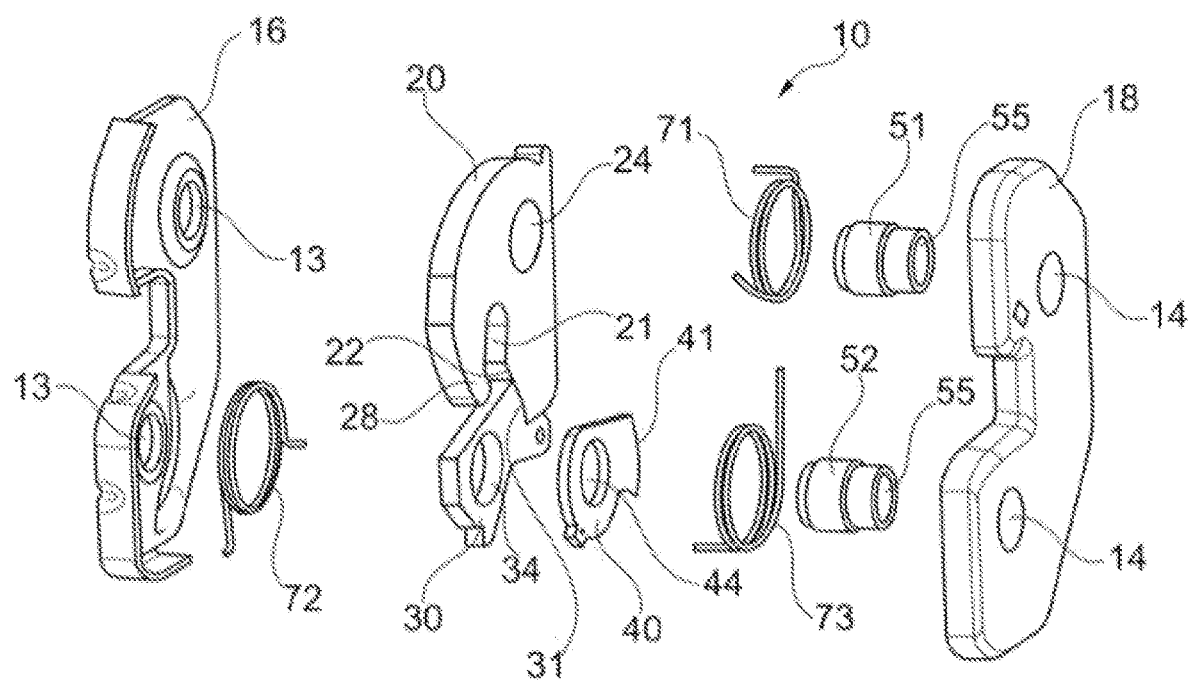
FIG. 2 is an exploded view of a generic locking unit according to the prior art.
Figure 3:
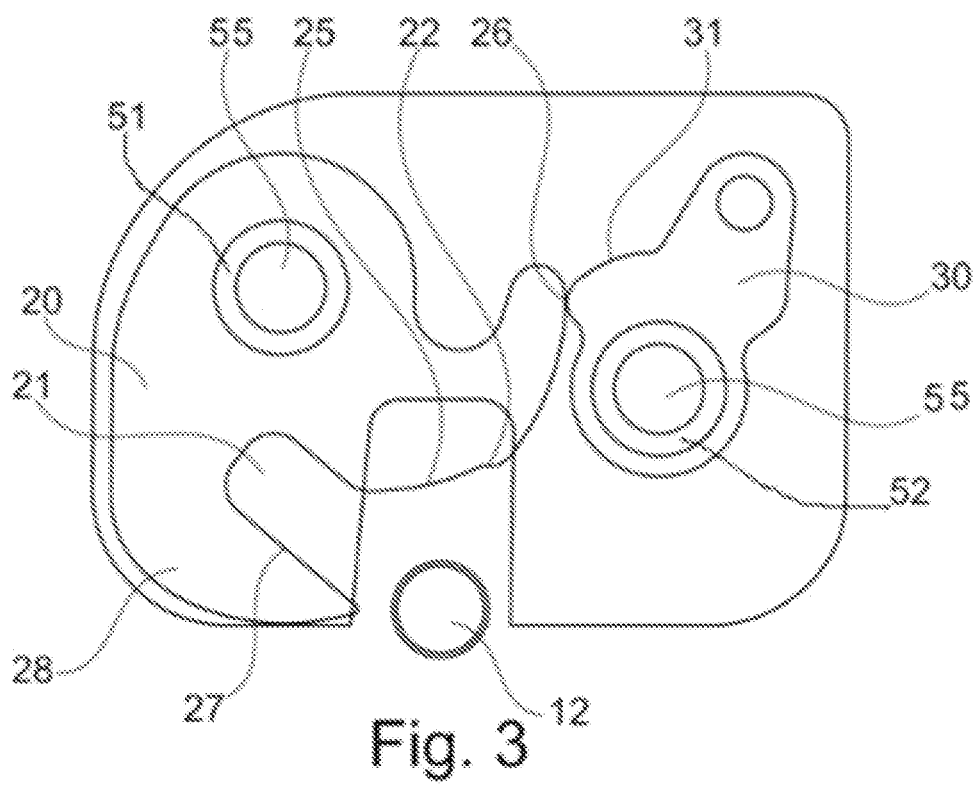
FIG. 3 is a schematic side view of a further generic locking unit according to the prior art in the unlocked state.
Figure 4:
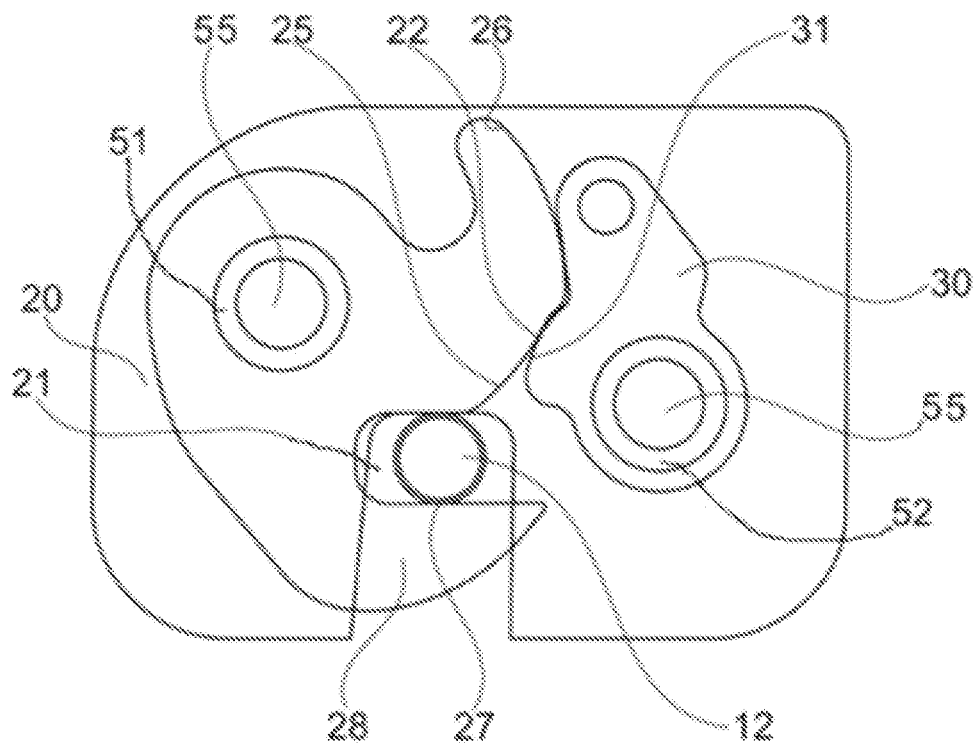
FIG. 4 is a schematic side view of the locking unit according to FIG. 3 in the locked state.

Referring to the drawings, in a motor vehicle, a locking unit 10 is provided for attaching a backrest 3 of a vehicle seat 1, in particular a rear seat, to a vehicle structure. The backrest 3 is in this case attached to a seat part 5 so as to be pivotable from a use position into a non-use position.

The locking unit 10, however, is also able to be used at different positions, for example for fastening the seat part 5 of the vehicle seat 1 to the floor structure of the motor vehicle or in a door lock.

The arrangement of the vehicle seat 1 inside the vehicle and the usual direction of travel thereof define the directional information used hereinafter. In this case a direction oriented perpendicular to the ground is denoted hereinafter as the vertical direction and a direction perpendicular to the vertical direction and perpendicular to the direction of travel is denoted hereinafter as the transverse direction.

A locking unit 10 according to the prior art has a lock housing which comprises a side plate 16 and a cover plate 18. The bottom surfaces of the side plate 16 and the cover plate 18 are of planar design and arranged in one plane defined by the direction of travel and the vertical direction, i.e. perpendicular to the transverse direction. The side plate 16 comprises two first bearing bores 13 of circular design. The cover plate 18 comprises two second bearing bores 14 of circular design.

A receiver opening, which opens in the direction of a locking bolt 12, is formed in the side plate 16 and in the cover plate 18 in order to receive said locking bolt for locking. In the present case, the locking unit 10 is fastened to the backrest 3 and the locking bolt 12 is fastened to the vehicle structure. It is also conceivable that the locking unit 10 is fastened to the vehicle structure and the locking bolt 12 is fastened to the backrest 3. In the present case, the portion of the locking bolt 12 to be received by the receiver opening extends horizontally in the transverse direction.

A rotary latch 20 is pivotably mounted on a first bearing pin 51 which is fastened to the side plate 16 and to the cover plate 18. To this end, the rotary latch 20 has a rotary latch hole 24 which is penetrated by the first bearing pin 51. The rotary latch 20 also comprises a hook jaw 21 for cooperating with the locking bolt 12. By means of a first spring 71, the rotary latch 20 is pretensioned in the opening direction.

The rotary latch 20 has a supporting contour 22 which partially defines the hook jaw 21 to the side. The supporting contour 22 is configured to be approximately planar but may also be curved, for example, in a circular-arc manner and may be of concave configuration. In the locked state of the locking unit 10 the supporting contour 22 faces approximately in the direction of a second bearing pin 52 which extends parallel to the first bearing pin 51.

On the side of the hook jaw 21 remote from the rotary latch hole 24, opposing the supporting contour 22, the hook jaw 21 is laterally defined by a nose 28 of the rotary latch 20. The nose 28 has a retention contour 27 which in the locked state of the locking unit 10 bears against the locking bolt 12.

The first bearing pin 51 is inserted into a first bearing bore 13 of the side plate 16 and into a second bearing bore 14 of the cover plate 18 and protrudes perpendicularly from the bottom surfaces of the side plate 16 and the cover plate 18.

The first bearing pin 51 thus extends in the present case in the transverse direction. The first bearing pin 51 has a through-opening 55 with an approximately constant internal diameter.

The second bearing pin 52 is also inserted into one respective first bearing bore 13 of the side plate 16 and into one respective second bearing bore 14 of the cover plate 18 and protrudes perpendicularly from the bottom surfaces of the side plate 16 and the cover plate 18. The second bearing pin 52 thus also extends in the present case in the transverse direction. The second bearing pin 52 has, in the same manner as the first bearing pin 51, a through-opening 55 with an approximately constant internal diameter.

The through-openings 55 of the bearing pins 51, 52 serve to receive a fastening means, for example a screw, the locking unit 10 being fastened thereby to the backrest 3 or to another structural part of the vehicle seat 1 or of the vehicle during assembly. To this end, the screws are screwed into fastening bores in the structural part.

A clamping element 40 is pivotably mounted on the second bearing pin 52. To this end, the clamping element 40 has a clamping element hole 44 which in the present case is circular and which is penetrated by the second bearing pin 52. By means of a third spring 73, the clamping element 40 is pretensioned toward the rotary latch 20.

In the locked state of the locking unit 10 when the hook jaw 21 of the rotary latch 20 receives the locking bolt 12, the clamping element 40 exerts a closing moment on the rotary latch 20 due to the pretensioning by the third spring 73 as a securing element. To this end, the clamping element 40 has a clamping surface 41 which is curved eccentrically relative to the second bearing pin 52 and which is not in self-locking contact with the supporting contour 22 of the rotary latch 20. The clamping surface 41 in the present case is curved in a circular-arc manner and configured to be convex.

A latching pawl 30 is arranged on the second bearing pin 52 axially adjacent to the clamping element 40 and also pivotably mounted on the second bearing pin 52, i.e. aligned with the clamping element 40. To this end, the latching pawl 30 has a latching pawl hole 34 which in the present case is circular and which is penetrated by the second bearing pin 52. By means of a second spring 72, the latching pawl 30 is pretensioned toward the rotary latch 20.

The latching pawl 30 has a latching surface 31 which is located in the vicinity of the clamping surface 41 of the clamping element 40. In the locked state of the locking unit 10 the latching surface 31 is positioned spaced apart from the supporting contour 22 of the rotary latch 20. The latching surface 31 in the present case is curved in a circular-arc manner and of convex configuration, but may also be planar.

The latching pawl 30 in the present case is arranged adjacent to the side plate 16 and the clamping element 40 in the present case is arranged adjacent to the cover plate 18. The latching pawl 30 and the clamping element 40 are coupled for entrainment with free travel, for example by means of a slot-pin guide or by means of an axially protruding drive element.

The direction in which the bearing pins 51, 52 extend is denoted hereinafter as the axial direction. In the present case, in the situation described here of the locking unit 10 installed on the backrest 3 of the vehicle seat 1, the axial direction extends parallel to the transverse direction.

In the locked state of the locking unit 10, the locking bolt 12 is located in the receiver opening, formed in the side plate 16 and the cover plate 18, and in the hook jaw 21 of the closed rotary latch 20. The retention contour 27 of the nose 28 bears against the locking bolt 12. The clamping element 40 secures the rotary latch 20 by the cooperation of the clamping surface 41 with the supporting contour 22. The latching surface 31 of the latching pawl 30 is slightly spaced apart from the supporting contour 22 of the rotary latch 20.

For opening the locking unit 10, the latching pawl 30 is pivoted away from the rotary latch 20, whereby the latching surface 31 of the latching pawl 30 is moved further away from the supporting contour 22 of the rotary latch 20. The latching pawl 30 drives the clamping element 40 due to the coupling for entrainment so that the rotary latch 20 is no longer secured.

By the pretensioning due to the first spring 71, the rotary latch 20 opens and thus pivots in the opening direction. Alternatively or additionally to the pretensioning by the first spring 71, the rotary latch 20 may also be driven by the latching pawl 30 or by the clamping element 40 in order to be opened.

Due to the pivoting movement of the rotary latch 20, the hook jaw 21 pulls back from the receiver opening formed by the side plate 16 and the cover plate 18, and releases the locking bolt 12. The locking bolt 12 slides at the same time along a closure contour 25 provided on the rotary latch 20 and moves away from the locking unit 10 counter to the pivoting-in direction.

Once the locking bolt 12 has left the hook jaw 21, the locking unit 10 is in the unlocked state. At the same time, a hold-open contour 26 provided on the rotary latch 20 blocks the latching pawl 30 in its position.

If in this unlocked state of the locking unit 10 the locking bolt 12 again reaches the receiver opening formed by the side plate 16 and the cover plate 18, and comes to bear against the closure contour 25 on the edge of the hook jaw 21, the locking bolt 12 forces the rotary latch 20 into its closed position. The clamping element 40, due to its pretensioning by the third spring 73, moves along the supporting contour 22. Driven by the clamping element 40 or due to the pretensioning by the second spring 72, the latching pawl 30 which is no longer blocked by the hold-open contour 26 pivots toward the rotary latch 20, wherein the latching surface 31 of the supporting contour 22 approaches the rotary latch 20. Subsequently, the locking unit 10 is once again in the locked state.

The rotary latch 20 of the locking unit 10 according to the prior art thus has a supporting contour 22, a closure contour 25, a hold-open contour 26 and a retention contour 27.

Figure 5:
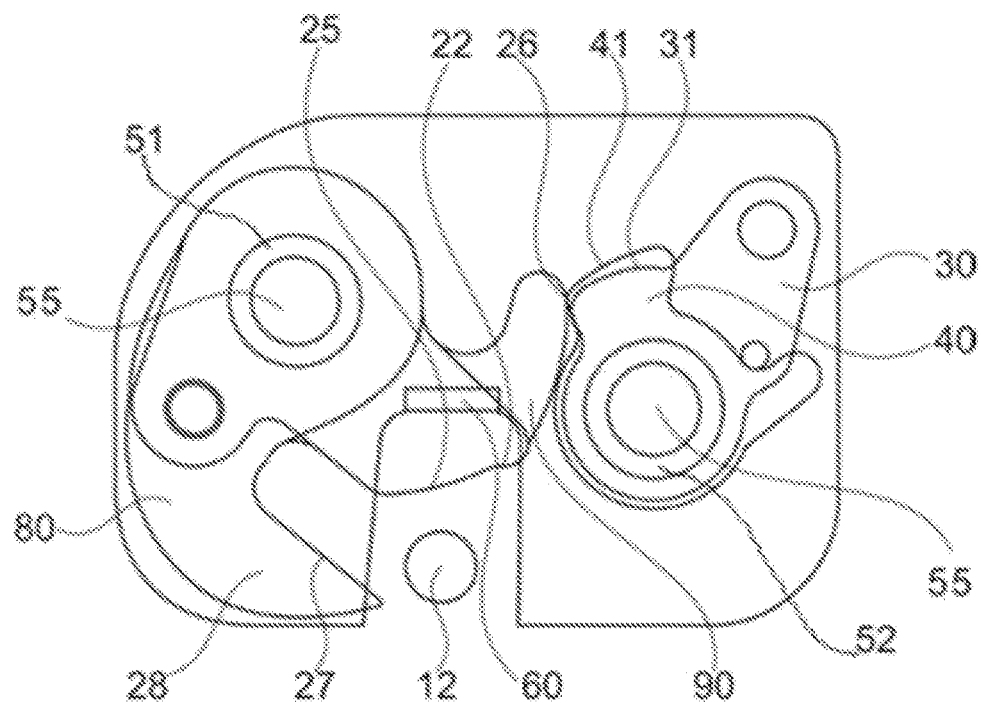
FIG. 5 is a schematic side view of a first exemplary embodiment of a locking unit according to the invention in the unlocked state.

In FIG. 5 a first exemplary embodiment of a locking unit 10 according to the invention in the unlocked state is shown schematically. Hereinafter, details are substantially provided about the differences between the first exemplary embodiment and the locking unit disclosed in the prior art.

Instead of the rotary latch, the locking unit 10 according to the first exemplary embodiment has a locking pawl 80 and a claw 90 which are pivotably mounted offset in the axial direction parallel to the first bearing bolt 51. In the present case, the locking pawl 80 and the claw 90 are connected together fixedly in terms of rotation. In this case, the claw 90 opposes the latching pawl 30 and the clamping element 40.

The locking pawl 80 and the claw 90 are thus arranged in separate functional planes. A functional plane extends in this case perpendicular to the axial direction and has, in contrast to a mathematical plane, an extent in the axial direction. The latching pawl 30 and the clamping element 40 are located in the functional plane of the claw 90.

The locking pawl 80 has a nose 28 with a retention contour 27. In the locked state of the locking unit 10 the retention contour 27 bears against the locking bolt 12.

The claw 90 has a supporting contour 22, a closure contour 25 and a hold-open contour 26. In the locked state of the locking unit 10 the supporting contour 22 bears against the clamping surface 41 of the clamping element 40 and the latching surface 31 of the latching pawl 30 is slightly spaced apart from the supporting contour 22 of the claw 90.

In the unlocked state of the locking unit 10 the hold-open contour 26 of the claw 90 bears against the latching pawl 30. During the locking and the unlocking of the locking unit 10, the closure contour 25 of the claw 90 is in contact with the locking bolt 12.

In the present case, a stop element 60 is attached to the cover plate 18, the locking bolt 12 bearing thereagainst in the locked state of the locking unit 10. In the locked state of the locking unit 10 the locking bolt 12 is thus tensioned between the retention contour 27 of the locking pawl 80 and the stop element 60.

The stop element 60 in this case is arranged in the functional plane of the locking pawl 80. In the locked state of the locking unit 10 the points of contact of the locking bolt 12 with the retention contour 27 of the locking pawl 80 and with the stop element 60 are located approximately in one plane which extends perpendicular to the axial direction.

During the locking and the unlocking of the locking unit 10 the claw 90 pivots past the stop element 60.

Figure 6:
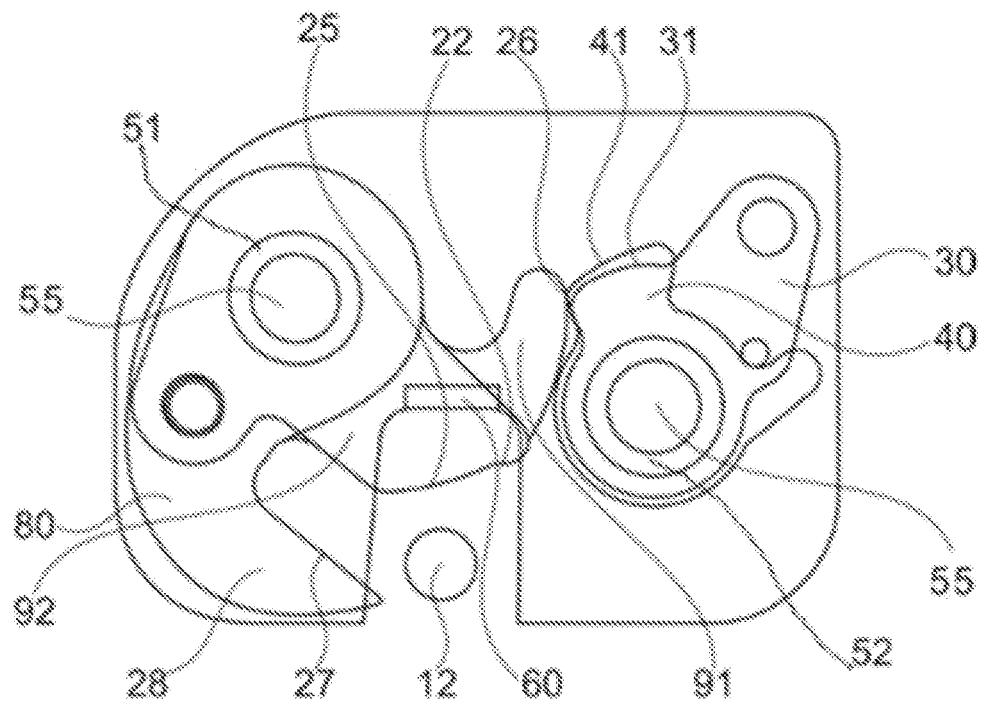
FIG. 6 is a schematic side view of a second exemplary embodiment of a locking unit according to the invention in the unlocked state.

In FIG. 6 a second exemplary embodiment of a locking unit 10 according to the invention is shown schematically in the unlocked state. Hereinafter, details are substantially provided about the differences between the second exemplary embodiment and the locking unit known from the prior art.

Instead of a rotary latch, according to the second exemplary embodiment the locking unit 10 has a locking pawl 80, a clamping claw 92 and a latching claw 91, which are pivotably mounted offset in the axial direction parallel to the first bearing pin 51. The locking pawl 80, the clamping claw 92 and the latching claw 91 in the present case are connected together fixedly in terms of rotation. The latching claw 91 in this case opposes the latching pawl 30 and the clamping claw 92 opposes the clamping element 40.

The locking pawl 80, the latching claw 91 and the clamping claw 92 are thus arranged in separate functional planes. A functional plane extends in this case perpendicular to the axial direction and has, in contrast to a mathematical plane, an extent in the axial direction. The latching pawl 30 is located in the functional plane of the latching claw 91. The clamping element 40 is located in the functional plane of the clamping claw 92.

The locking pawl 80 has a nose 28 with a retention contour 27. In the locked state of the locking unit 10 the retention contour 27 bears against the locking bolt 12.

The latching claw 91 has a first supporting contour 22, a first closure contour 25 and a hold-open contour 26. In the locked state of the locking unit 10 the latching surface 31 of the latching pawl 30 is slightly spaced apart from the first supporting contour 22 of the latching claw 91.

In the unlocked state of the locking unit 10, the hold-open contour 26 of the latching claw 91 bears against the latching pawl 30. During the locking and the unlocking of the locking unit 10 the first closure contour 25 of the latching claw 91 comes into contact with the locking bolt 12.

The clamping claw 92 has a second supporting contour 22 and a second closure contour 25. In the locked state of the locking unit 10, the second supporting contour 22 of the clamping claw 92 bears against the clamping surface 41 of the clamping element 40.

During the locking and the unlocking of the locking unit 10 the second closure contour 25 of the clamping claw 92 comes into contact with the locking bolt 12.

In the present case, a stop element 60 is attached to the cover plate 18, the locking bolt 12 bearing thereagainst in the locked state of the locking unit 10. In the locked state of the locking unit 10 the locking bolt 12 is thus clamped between the retention contour 27 of the locking pawl 80 and the stop element 60.

The stop element 60 is arranged in this case in the functional plane of the locking pawl 80. In the locked state of the locking unit 10, the points of contact of the locking bolt 12 with the retention contour 27 of the latching pawl 80 and with the stop element 60 are located approximately in one plane which extends perpendicular to the axial direction.

During the locking and the unlocking of the locking unit 10 the clamping claw 92 and the latching claw 91 pivot past the stop element 60.

Figure 7:
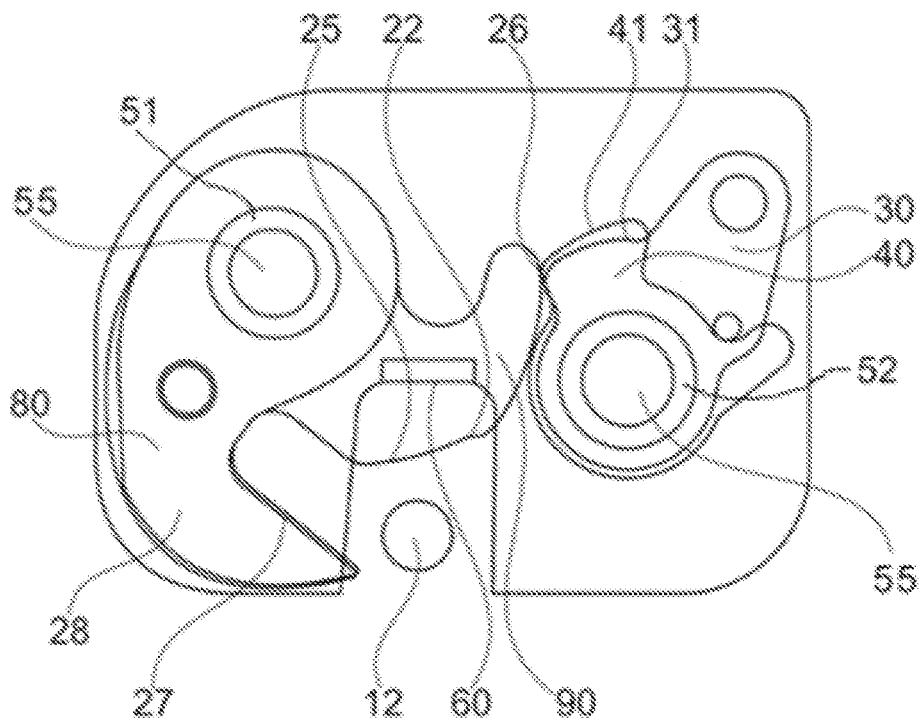
FIG. 7 is a schematic side view of a third exemplary embodiment of a locking unit according to the invention in the unlocked state.
Figure 8:
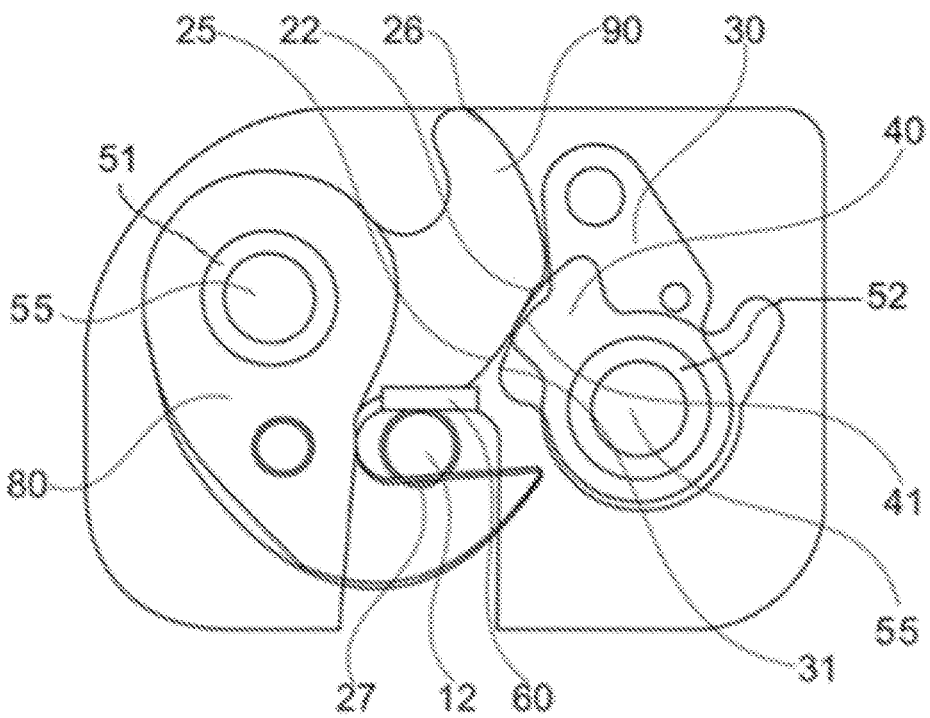
FIG. 8 is a schematic side view of the third exemplary embodiment according to FIG. 7 in the locked state.
Figure 9:
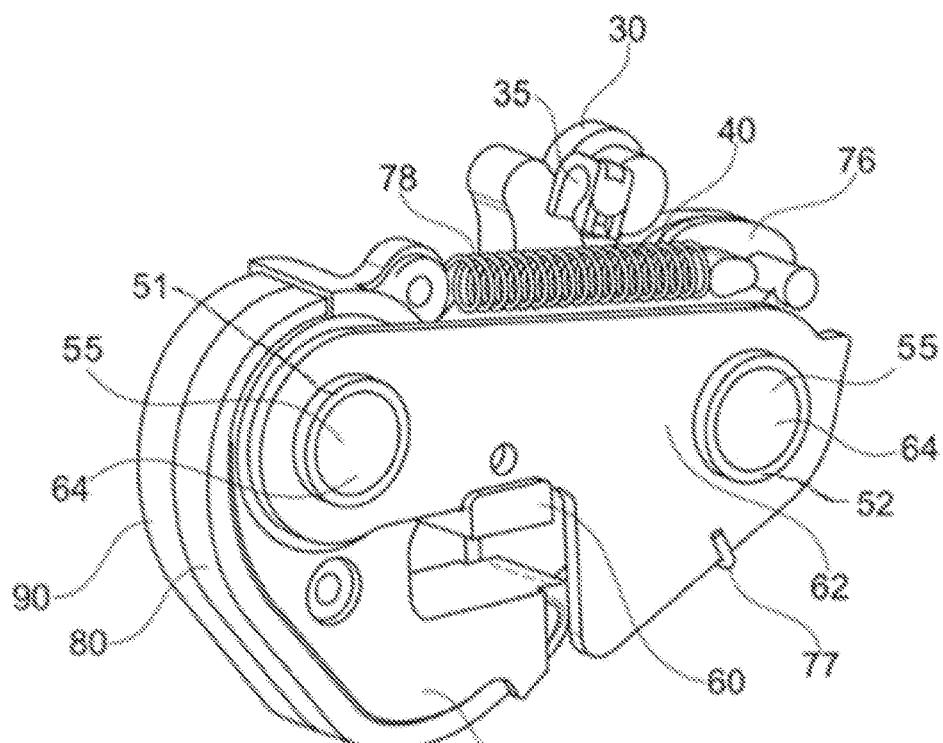
FIG. 9 is a perspective view of a fourth exemplary embodiment of a locking unit according to the invention in the locked state.
Figure 10:
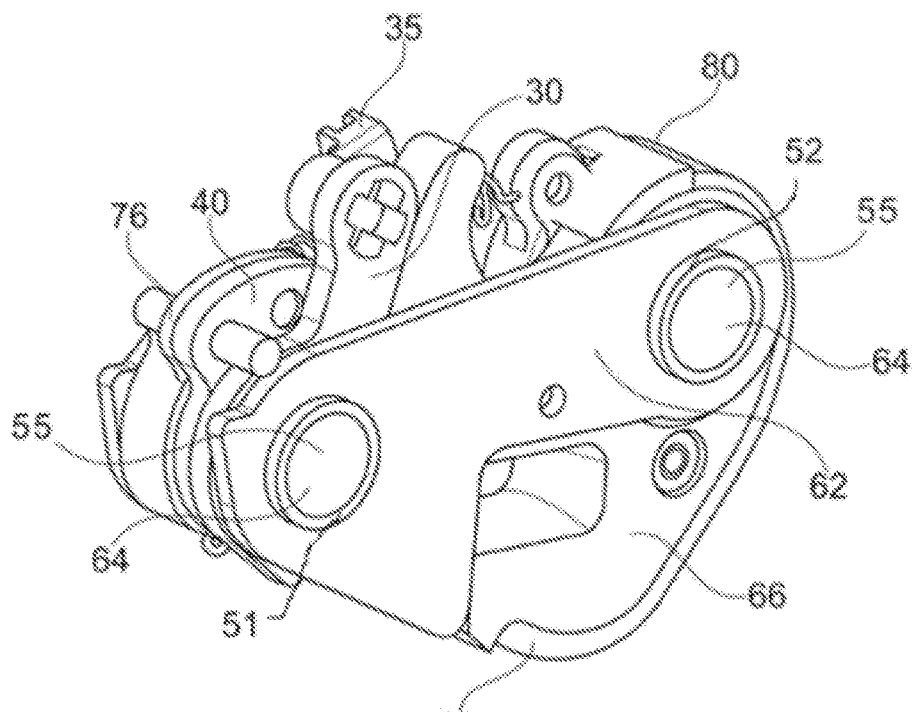
FIG. 10 is a further perspective view of the fourth exemplary embodiment according to FIG. 9 in the locked state.
Figure 11:
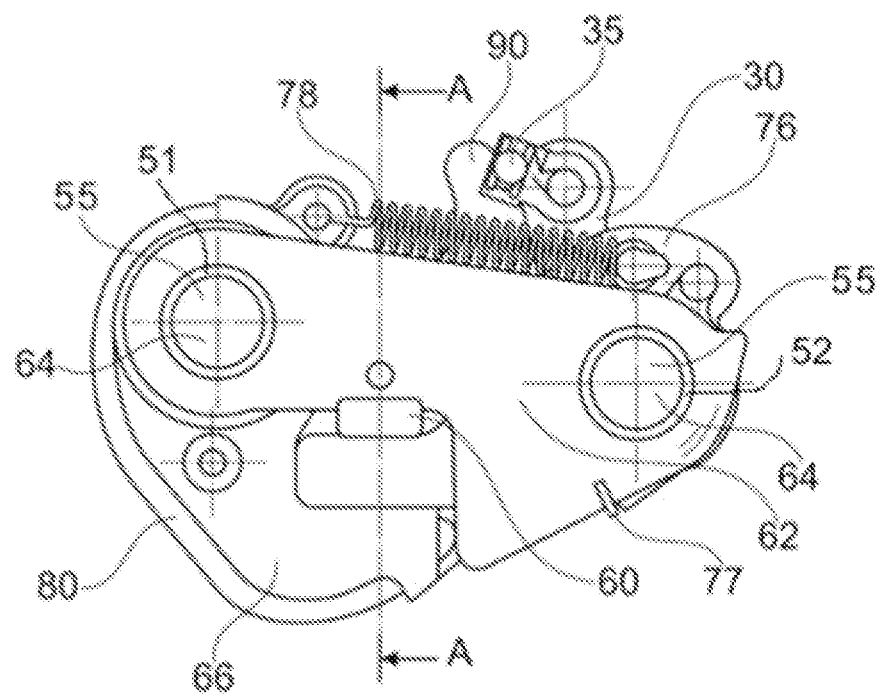
FIG. 11 is a side view of the fourth exemplary embodiment according to FIG. 9 in the locked state.
Figure 12:
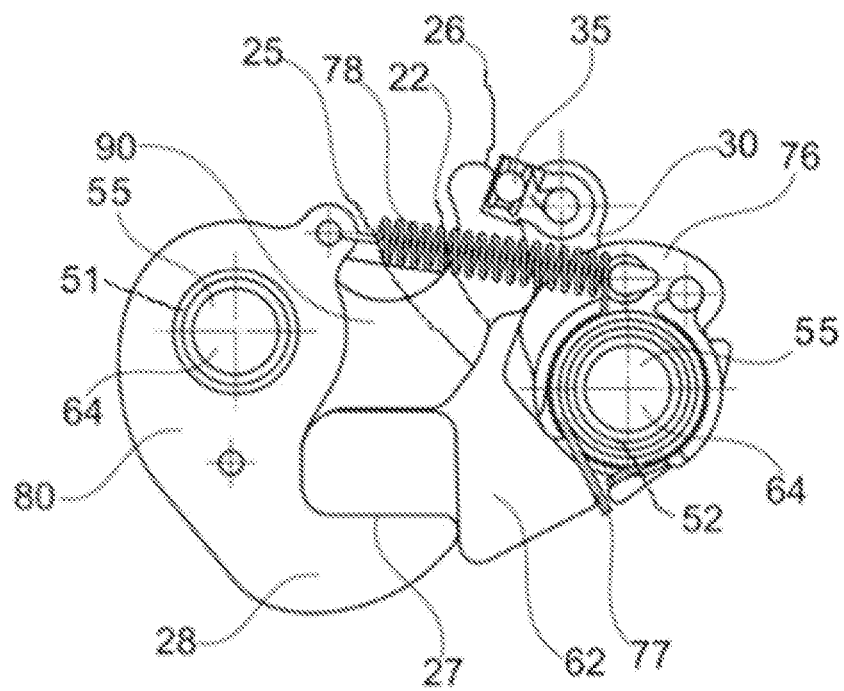
FIG. 12 is a side view of the fourth exemplary embodiment according to FIG. 9 in the locked state without the front coupling plate and without the covering.

In FIG. 7 to FIG. 8 a third exemplary embodiment of a locking unit 10 according to the invention is shown. Hereinafter, details are substantially provided about the differences between the third exemplary embodiment and the locking unit known from the prior art.

Instead of a rotary latch, the locking unit 10 according to the third exemplary embodiment has a locking pawl 80 and a claw 90 which are pivotably mounted offset in the axial direction parallel to the first bearing pin 51. In the present case, the locking pawl 80 and the claw 90 are connected together fixedly in terms of rotation. The claw 90 in this case opposes the latching pawl 30 and the clamping element 40.

The locking pawl 80 and the claw 90 are thus arranged in separate functional planes. A functional plane extends in this case perpendicular to the axial direction and has, in contrast to a mathematical plane, an extent in the axial direction. The latching pawl 30 and the clamping element 40 are located in the functional plane of the claw 90.

The locking pawl 80 has a first nose 28 with a first retention contour 27. In the locked state of the locking unit 10 the first retention contour 27 of the locking pawl 80 bears against the locking bolt 12.

The claw 90 has a supporting contour 22, a closure contour 25, a hold-open contour 26 and a second nose 28 with a second retention contour 27.

In the locked state of the locking unit 10 the supporting contour 22 of the claw 90 bears against the clamping surface 41 of the clamping element 40 and the latching surface 31 of the latching pawl 30 is slightly spaced apart from the supporting contour 22 of the claw 90.

In the locked state of the locking unit 10, moreover, the second retention contour 27 of the claw 90 bears against the locking bolt 12.

In the unlocked state of the locking unit 10, the hold-open contour 26 of the claw 90 bears against the latching pawl 30. During the locking and the unlocking of the locking unit 10 the closure contour 25 of the claw 90 is in contact with the locking bolt 12.

In the present case, a stop element 60 is attached to the cover plate 18, the locking bolt 12 in the locked state of the locking unit 10 bearing against said stop element. In the locked state of the locking unit 10 the locking bolt 12 is thus clamped between the first retention contour 27 of the locking pawl 80 and the stop element 60.

In this case, the stop element 60 is arranged in the functional plane of the locking pawl 80. In the locked state of the locking unit 10 the points of contact of the locking bolt 12 with the first retention contour 27 of the locking pawl 80 and with the stop element 60 are located approximately in one plane which extends perpendicular to the axial direction.

During the locking and the unlocking of the locking unit 10 the claw 90 pivots past the stop element 60.

In FIG. 9 to FIG. 14 a fourth exemplary embodiment of a locking unit 10 according to the invention is shown. The fourth exemplary embodiment in this case is substantially the same as the third exemplary embodiment. Hereinafter, therefore, details are substantially provided about the differences between the fourth exemplary embodiment and the third exemplary embodiment.

The locking unit 10 according to the fourth exemplary embodiment comprises two coupling plates 62 which in the present case consist of metal and are configured to be planar. The two coupling plates 62 extend parallel to one another and in each case have two retaining bores 64 for receiving two bearing pins 51, 52.

A locking pawl 80 and a claw 90 are surrounded by a common covering 66 which in the present case consists of plastics. The covering 66 covers, amongst other things, the retention contours 27 of the noses 28 of the locking pawl 80 and the claw 90. In the region in which the covering 66 covers the retention contours 27, the covering 66 is configured to be slightly bulged in a convex manner. The bulging of the surface 100 of the covering 66 in this case forms, as shown, an apex 101 which is arranged offset in the axial direction relative to the center of the width of the surface 100. In this case, it may also be derived from FIG. 13 that a first portion 102 and a second portion 103 extend respectively to the left and right of the apex 101.

The first portion in this case has a curvature with a relatively small radius whilst the second portion has a large radius compared to the radius of the first portion. The ratio of the first portion and the second portion to one another may, for example, be determined and provided using the respective radii, widths, inclines and/or angles. These ratios may vary, for example, ranging from 1:1, 1 to 1:50 depending on the aforementioned dimensional information.

Figure 13:
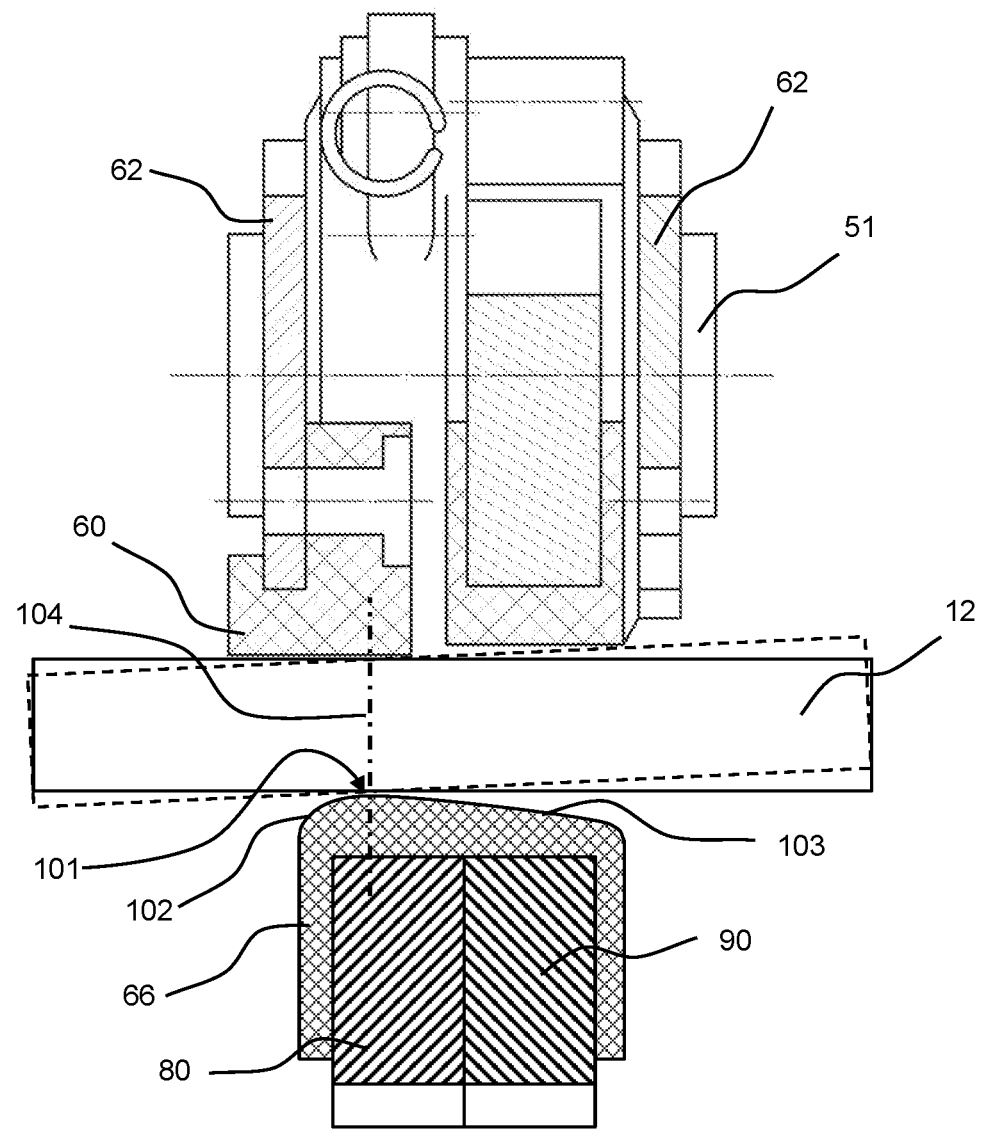
FIG. 13 is a section along the line A-A in FIG. 11.
Figure 14:
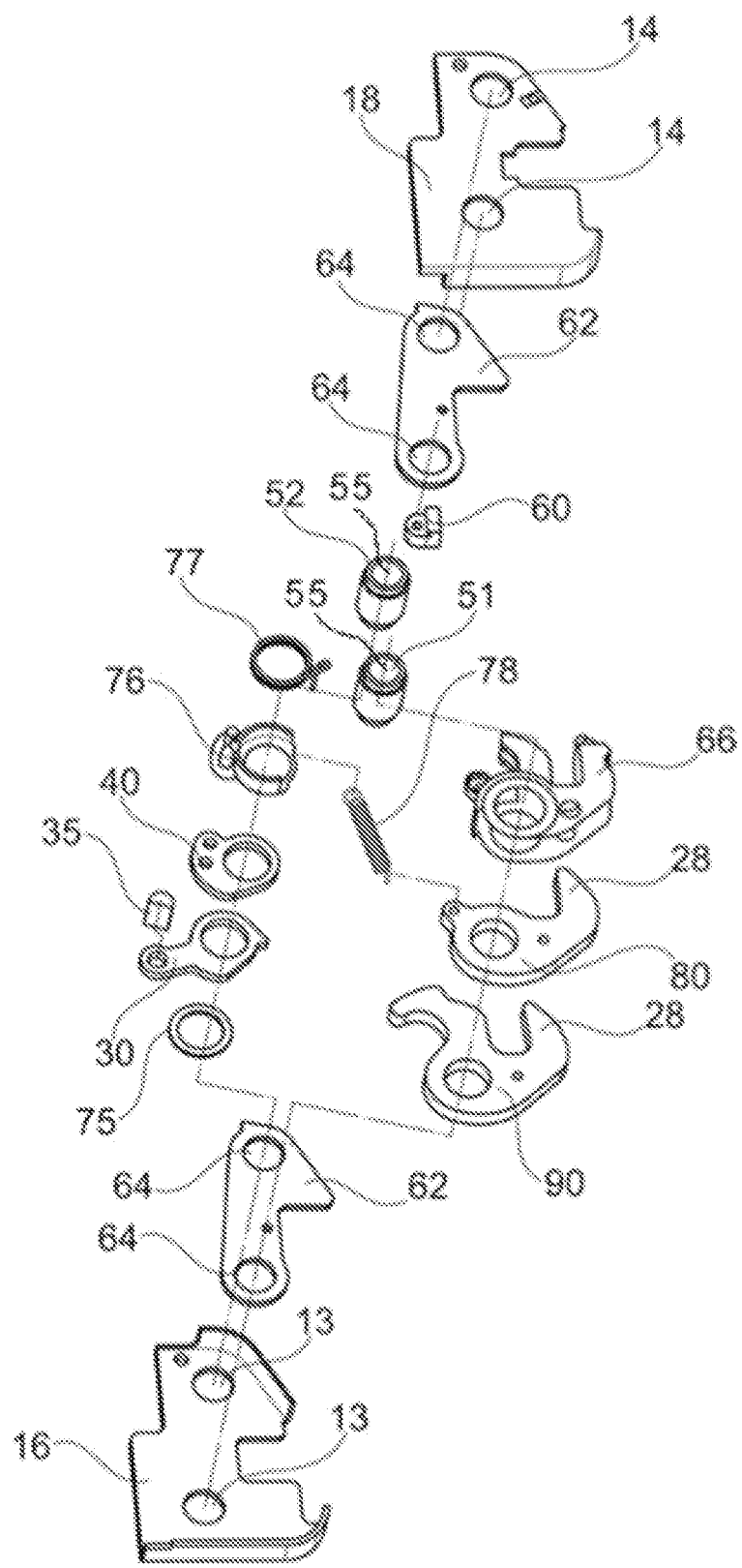
FIG. 14 is an exploded view of the fourth exemplary embodiment according to FIG. 9.

The covering 66 is bulged such that in the locked state of the locking unit 10 the points of contact of the locking bolt 12 with the covering 66 of the retention contours 27 and with the stop element 60 are located approximately in a contact plane 104 which extends perpendicular to the axial direction. Also, in the case of a slight incline of the locking bolt 12 relative to the axial direction, which is indicated in FIG. 13 by a broken contour line, the point of contact of the locking bolt 12 with the covering 66 of the retention contours 27 is displaced only slightly in the axial direction. In this case, the point of contact is moved, in particular, along the surface 100 of the covering 66 of the retention contour 27, in a region of the apex 101.

The first bearing pin 51, the locking pawl 80 and the claw 90 being pivotably arranged thereon, is inserted on both sides in one respective retaining bore 64 of a coupling plate 62 and fastened there.

On the second bearing pin 52 a spacer washer 75, a latching pawl 30, a clamping element 40 and a drive element 76 are pivotably mounted adjacent to one another. Also, the second bearing pin 52 is inserted on both sides in one respective retaining bore 64 of a coupling plate 62 and fastened there.

By means of a leg spring 77 the latching pawl 30 is pretensioned toward the rotary latch 20. The leg spring 77 is wound around the second bearing pin 52 and is supported by one respective spring end on one of the coupling plates 62 and on the latching pawl 30.

The clamping element 40 is connected fixedly in terms of rotation to the drive element 76. A tension spring 78 is fastened to the latching pawl 80 and to the drive element 76. By means of the tension spring 78, the latching pawl 80 is pretensioned in the opening direction and the clamping element 40 is pretensioned toward the rotary latch 20.

A latching sleeve 35 is provided on the latching pawl 30, in the present case clipped in, said latching sleeve in the present case consisting of plastics and serving for fastening an actuating rod, not shown here.

The stop element 60 is fastened to the coupling plate 62 adjacent to the locking pawl 80. Optionally a side plate 16 and a cover plate 18 form a lock housing for the locking element 10.

Figure 15:
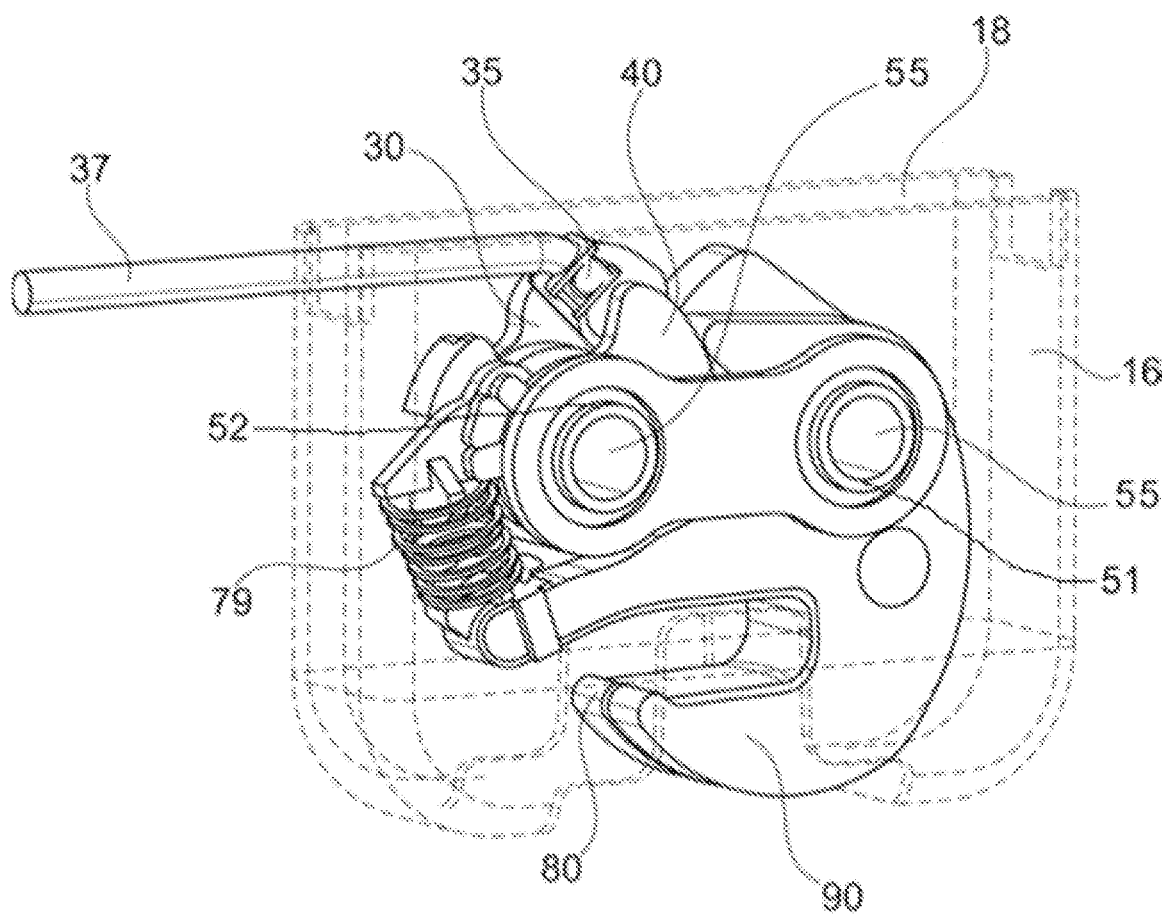
FIG. 15 is a perspective view of a fifth exemplary embodiment of a locking unit according to the invention in the locked state.

In FIG. 15 a fifth exemplary embodiment of a locking unit 10 according to the invention is shown. The fifth exemplary embodiment in this case is substantially the same as the fourth exemplary embodiment.

Instead of a tension spring, a compression spring 79 which is fastened between the claw 90 and to the clamping element 40 is provided. By means of the compression spring 79, the locking pawl 80 is pretensioned in the opening direction and the clamping element 40 is pretensioned toward the rotary latch 20.

An actuating rod 37 is fastened to the latching sleeve 35 provided on the latching pawl 30.

Figure 16:
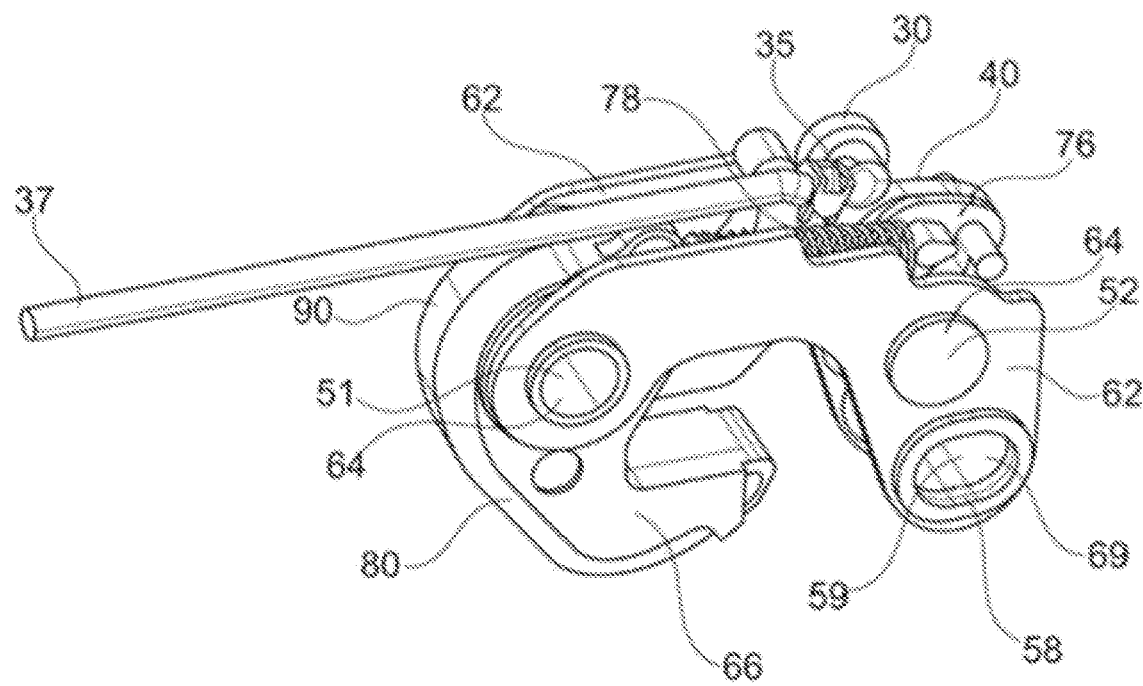
FIG. 16 is a perspective view of a sixth exemplary embodiment of a locking unit according to the invention in the locked state.
Figure 17:
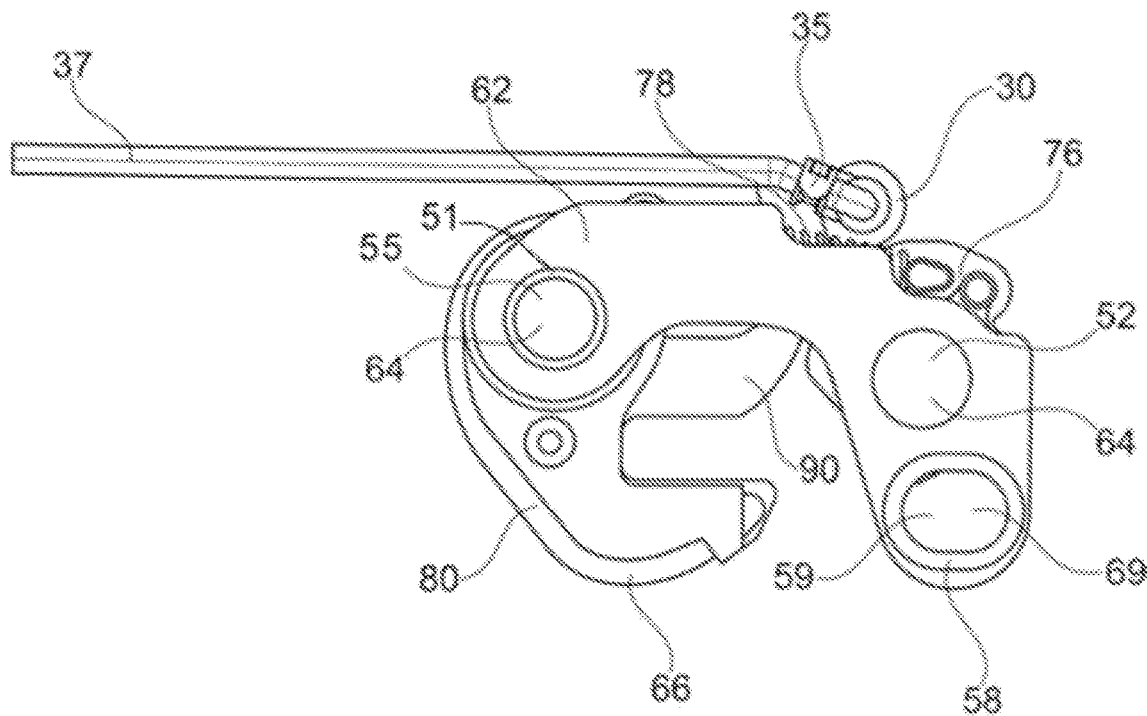
FIG. 17 is a side view of the sixth exemplary embodiment according to FIG. 16 in the locked state.

In FIG. 16 and FIG. 17, a sixth exemplary embodiment of a locking unit 10 according to the invention is shown. The sixth exemplary embodiment in this case is substantially the same as the fourth exemplary embodiment.

One respective retaining opening 69 is provided in the two coupling plates 62 adjacent to the two retaining bores 64. The retaining openings 69 in each case are designed as slots. A retaining pin 58 is inserted into the two retaining openings 69. The retaining pin 58 is of hollow-cylindrical design and has a through-opening 59.

The retaining pin 58 in the present case has a cross section which deviates from the circular shape and is adapted to the slot shape of the retaining openings 69. Furthermore, the through-opening 59 has an elongated cross section deviating from the circular shape.

In the present case, the second bearing pin 52 is designed to be solid and therefore has no through-opening.

Two screws are provided for fastening the locking unit 10, said screws being inserted into the through-opening 55 of the first bearing pin 51 and into the through-opening 59 of the retaining pin 58. The screws are screwed into fastening bores in the structural part.

Due to the slot-shaped cross section of the through-opening 59 of the retaining pin 58, the spacing of the two screws to one another is variable. As a result, it is possible to adapt the locking unit 10 to different actual dimensions of the structural part.

As actual dimension is in this case denoted as the distance of the central axes of the fastening bores from one another.

Alternatively, the retaining pin 58 is designed in a similar manner to the first bearing pin 51 and has a circular cross section and a through-opening 59 with a circular cross section. For adapting the locking unit 10 to different actual dimensions, the retaining pin 58 may be pushed inside the slot-shaped retaining openings 69. As a result the distance between the two screws which are inserted into the through-opening 55 of the first bearing pin 51 and into the through-opening 59 of the retaining pin 58 is also variable. An actuating rod 37 is fastened to the latching sleeve 35 provided on the latching pawl 30.

Figure 18:
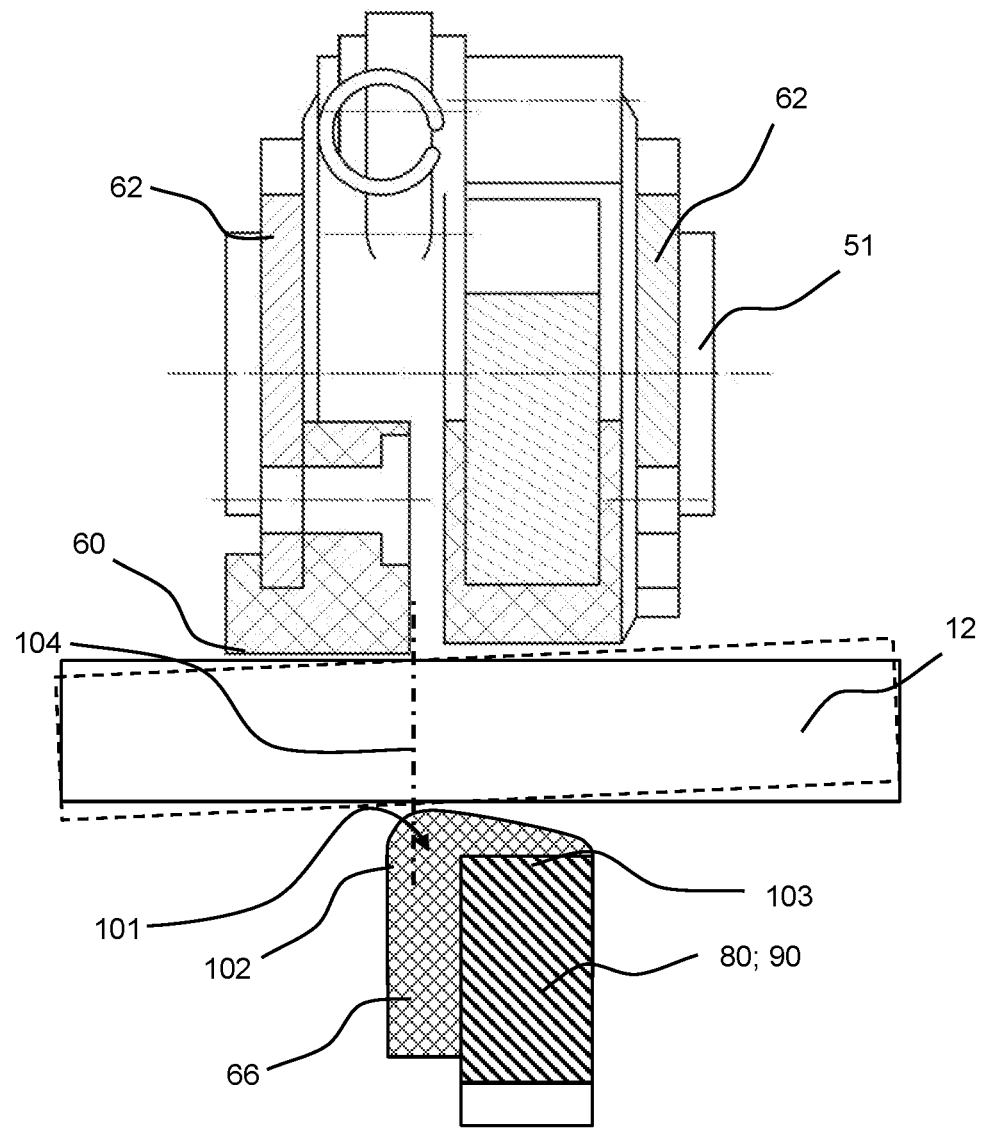
FIG. 18 is a section of an embodiment with the rotary latch along the line A-A of FIG. 11.

The embodiment shown in FIG. 18 has a claw 90 and a locking pawl 80 in the form of a rotary latch configured in one piece. The retention contour 27 of the claw 90 in this case is partially surrounded by a covering 66 which in the present case consists of plastics. The covering 66 covers substantially the retention contour 27 of the nose 28 of the rotary latch, in particular the claw 90. In the region in which the covering 66 covers the retention contours 27, the covering 66 is configured to be slightly bulged in a convex manner. The bulging of the surface 100 of the covering 66 in this case forms, as shown, an apex which is formed offset in the axial direction relative to the center of the width of the surface (100). In order to offset the apex 101 in the axial direction beyond the region of the claw 90, in the embodiment shown, the covering 66 has an increased width in a lateral portion, which is not referenced. The first portion 102 defined by means of the apex 101 and the second portion 103 may also be designed as described in FIG. 13.

The covering 66 is bulged such that in the locked state of the locking unit 10 the points of contact of the locking bolt 12 with the covering 66 of the retention contours 27 and with the stop element 60 are approximately located in a contact plane 104 which extends perpendicular to the axial direction. Also, in the case of a slight incline of the locking bolt 12 relative to the axial direction, which is indicated in FIG. 18 by a broken contour line, the point of contact of the locking bolt 12 with the covering 66 of the retention contours 27 is displaced only slightly in the axial direction. The point of contact moves in this case, in particular, along the surface 100 of the covering 66 of the retention contour 27 in a region of the apex 101.

The features disclosed in the above description, the claims and the drawings may be significant both individually and also in combination for implementing the invention in the various embodiments thereof.

While specific embodiments of the invention have been shown and described in detail to illustrate the application of the principles of the invention, it will be understood that the invention may be embodied otherwise without departing from such principles.

The invention claimed is:

1. A locking unit for a vehicle seat, the locking unit comprising:
    a locking pawl which is mounted so as to be pivotable about a pivot axis between an open position and a closed position and which has a retention contour for securing a locking bolt in the closed position; and
    at least one claw which is mounted so as to be pivotable about the same pivot axis, wherein the claw has a closure contour, wherein the locking pawl pivots from the open position to the closed position by the closure contour being acted upon by the locking bolt wherein a surface of a covering of the locking pawl facing the locking bolt has a path which in an axial direction has an apex which is offset relative to a center of a width of the surface in the axial direction.

2. The locking unit as claimed in claim 1, wherein the locking pawl and the at least one claw are connected together for rotation.

3. The locking unit as claimed in claim 1, wherein the covering covers the locking pawl and the claw.

4. The locking unit as claimed in claim 1, wherein the at least one claw which is offset relative to the locking pawl in the axial direction is pivotably mounted about the same pivot axis.

5. The locking unit as claimed in claim 1, further comprising a stop element is arranged such that, when the locking unit is locked, the locking bolt bears in a first point of contact against the stop element and in a second point of contact against the retention contour or the surface of the covering of the locking pawl, wherein the first point of contact and the second point of contact are located at least approximately in one plane which extends perpendicular to the axial direction.

6. The locking unit as claimed in claim 5, wherein the second point of contact is located in the region of the apex.

7. The locking unit as claimed in claim 1, wherein the retention contour or a surface of the covering of the locking pawl has a first portion and a second portion adjacent to one another in the apex, wherein the second portion is larger than the first portion.

8. The locking unit as claimed in claim 7, wherein the width of the second portion corresponds to a multiple of the width of the first portion.

9. The locking unit as claimed in claim 8, wherein the width of the second portion corresponds at least to 4 times the width of the first portion.

10. The locking unit as claimed in claim 7, wherein the first portion has a curvature with a radius ranging from 1 mm to 5 mm.

11. The locking unit as claimed in claim 10, wherein the first portion has a curvature with a radius ranging from 2.5 mm to 4 mm.

12. The locking unit as claimed in claim 7, wherein the second portion has a curvature with a radius ranging from 30 mm to 100 mm.

13. The locking unit as claimed in claim 12, wherein the second portion has a curvature with a radius ranging from 40 mm to 50 mm.

14. The locking unit as claimed in claim 7, wherein the first or second portion is chamfered with a planar surface.

15. A vehicle seat comprising at least one locking unit, the locking unit comprising:
    a locking pawl which is mounted so as to be pivotable about a pivot axis between an open position and a closed position and which has a retention contour for securing a locking bolt in the closed position; and
    at least one claw which is mounted so as to be pivotable about the same pivot axis, wherein the claw has a closure contour, wherein the locking pawl pivots from the open position to the closed position by the closure contour being acted upon by the locking bolt, wherein a surface of a covering of the locking pawl facing the locking bolt has a path which in an axial direction has an apex which is offset relative to a center of a width of the surface in the axial direction.

16. The vehicle seat as claimed in claim 15, wherein the locking pawl and the at least one claw are configured in one piece.

17. The vehicle seat as claimed in claim 15, wherein the covering covers the locking pawl and the claw.

18. The vehicle seat as claimed in claim 15, wherein the at least one claw is offset relative to the locking pawl in the axial direction is pivotably mounted about the same pivot axis.

19. The vehicle seat as claimed in claim 15, further comprising a stop element arranged such that, when the locking unit is locked, the locking bolt bears in a first point of contact against the stop element and in a second point of contact against the retention contour or the surface of the covering of the locking pawl, wherein the first point of contact and the second point of contact are located at least approximately in one plane which extends perpendicular to the axial direction.

20. The vehicle seat as claimed in claim 15, wherein the retention contour or a surface of the covering of the locking pawl has a first portion and a second portion adjacent to one another at the apex, wherein the second portion is larger than the first portion.

* * * * *